No. 831,716. PATENTED SEPT. 25, 1906.
J. W. GARDNER.
RUNNING GEAR.
APPLICATION FILED JAN. 25, 1906.
2 SHEETS—SHEET 1.
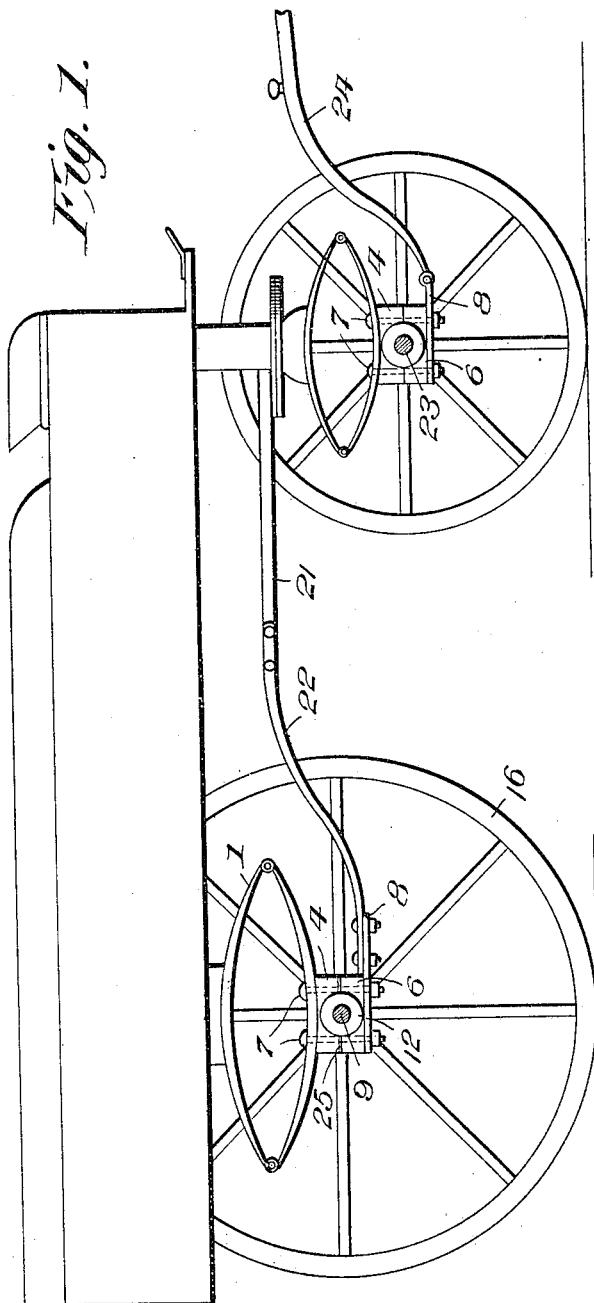
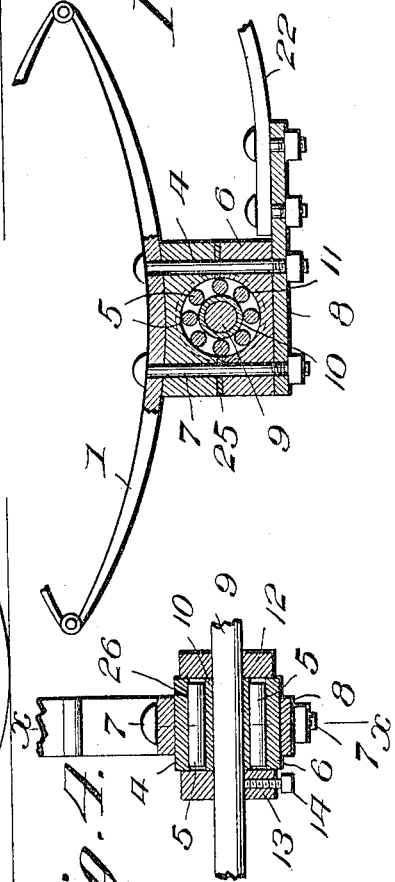
WITNESSES:
INVENTOR
J. W. Gardner
By W. J. Fitzgerald
Attorneys

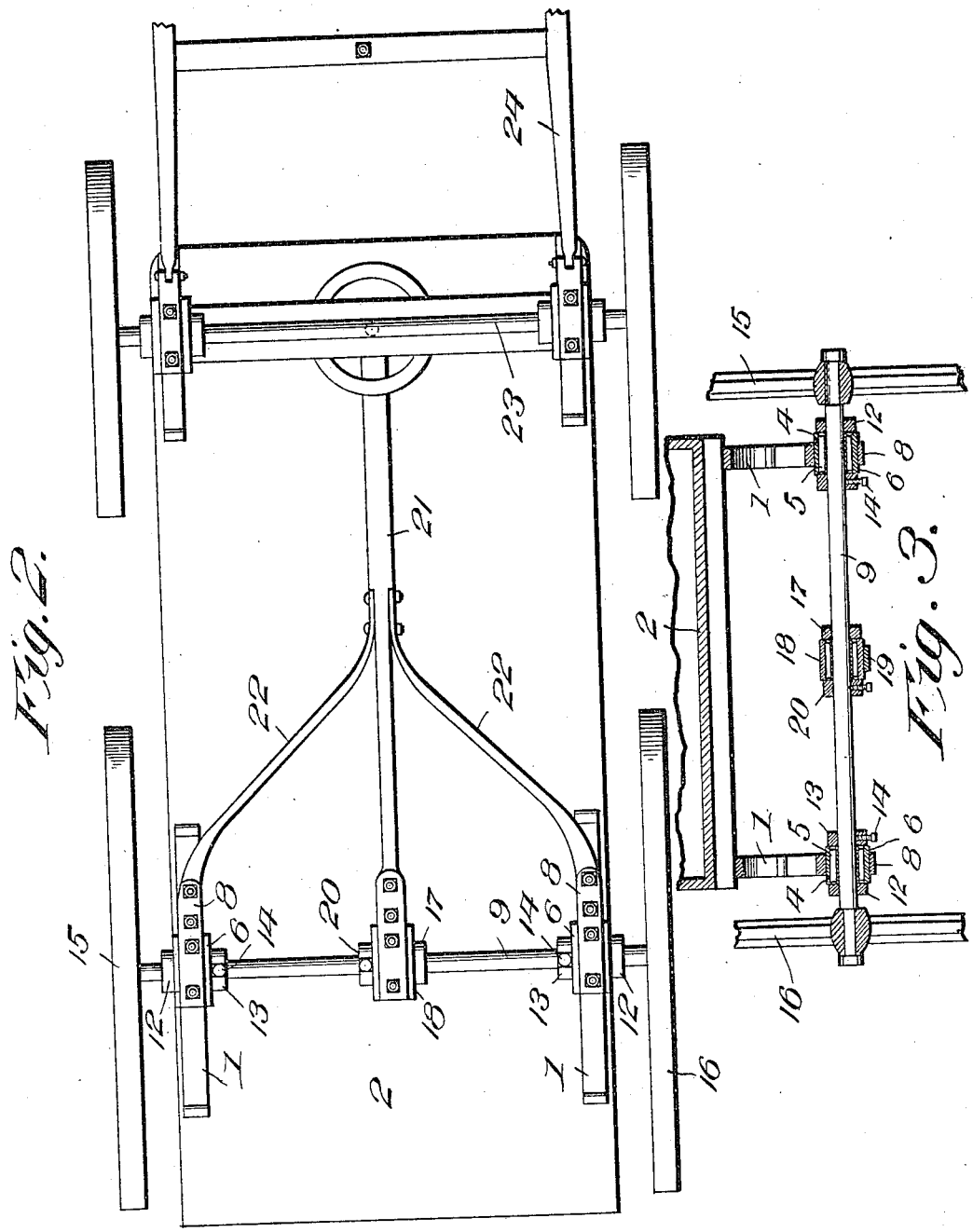

UNITED STATES PATENT OFFICE.

JAMES WILLIAM GARDNER, OF JARRATT, VIRGINIA.

RUNNING-GEAR.

No. 831,716.　　　　Specification of Letters Patent.　　　Patented Sept. 25, 1906.

Application filed January 25, 1906. Serial No. 297,859.

*To all whom it may concern:*

Be it known that I, JAMES WILLIAM GARDNER, a citizen of the United States, residing at Jarratt, in the county of Sussex and State of Virginia, have invented certain new and useful Improvements in Running-Gear; and I do hereby declare the following to be a full, clear, and exact description of the invention, such as will enable others skilled in the art to which it appertains to make and use the same.

My invention relates to running-gear for vehicles; and its object is to provide bearings of novel form in which the axles of the vehicle are adapted to rotate.

The invention consists of boxes, each of which is formed of two sections having spacing-strips interposed between them and adapted to be removed as wear occurs upon the working faces of the box-sections. The axles of the vehicle extend through these boxes, and rollers are disposed around the axle and within each box and are retained therein by means of collars locking on the axle. Another box is connected to the axle for the purpose of connecting the reach-pole of a vehicle to the axle, or where a reach-pole is not utilized this of course can be connected directly to the bed of the vehicle.

The invention also consists in further novel construction and combination of parts, hereinafter more fully described and claimed.

In the accompanying drawings I have shown the preferred form of my invention, and in said drawings—

Figure 1 is a side elevation of a wagon having my improvements applied thereto, the axles of the wagon being shown in section. Fig. 2 is a bottom plan view of the wagon. Fig. 3 is a section through the bearings of the rear axle. Fig. 4 is an enlarged section through one of said bearings, and Fig. 5 is a section on line *x x* of Fig. 4.

Referring to the figures by numerals of reference, 1 1 represent springs which are fastened in the usual manner to the bed 2 of a wagon, and these springs are mounted on the upper sections 4 of bearing-boxes, said sections being preferably substantially rectangular in form and having semicircular recesses 5 in their lower faces. Bottom sections 6, substantially similar to the sections 4, are disposed under and secured to the upper section 4 of the bearing-boxes, bolts 7 being disposed within the two sections for the purpose of clamping them together. These bolts also serve to secure the springs 1 to the upper block-sections and to fasten to the lower section 6 a base-plate 8, which extends forward from the bearing-block. Disposed between the sections of the bearing-boxes is an axle 9, and those portions of the axle surrounded by the bearing-boxes have sleeves 10 shrunk or otherwise connected to them and constituting working faces for rollers 11, which are arranged about the axle and within each bearing-block. Collars 12 are permanently connected to the axle and are so disposed as to close one end of the bearing-boxes. The other ends of these boxes are closed by means of adjustable collars 13, having set-screws 14, whereby they may be locked upon the axle.

One of the wheels 15 is secured to the axle, so as to rotate therewith; but the other wheel 16 is loosely mounted on the axle. Disposed upon the central portion of the axle 9 is a fixed collar 17, against which abuts a section or bearing-box 18, similar to the boxes connected to springs 1, said box containing antifriction-rollers 19, which are retained between the collar 17 and an adjustable collar 20. This centrally-disposed box is employed for the purpose of fastening the rear end of the reach-pole 21 of the vehicle, said reach-pole being secured to the bearing-box 18 by means of bolts or in any other preferred manner. Side braces 22 extend from the reach-pole and are fastened to the base-plates 8 of the side bearing-boxes. The front axle 23 of the vehicle is mounted in the same manner as is the rear axle 9, there being, however, but two bearing-boxes employed, as there is no necessity for a central box. The base-plates 8 of the bearing-boxes of the front axle serve as means for connecting the shafts 24 to the axle, as is clearly seen by reference to Figs. 1 and 2.

By employing rotating gear such as herein described the power required for moving a vehicle is greatly reduced because of the great reduction in the manner of friction occurring where the axles rotate within their bearings. The loose wheels only rotate on their axles when the wagon is being turned, and at all other times there is practically no friction produced upon the axles by these loose wheels. I preferably interpose strips 25 of leather or metal between the two sections of each bearing-box, and one or more of these strips can be removed in the event of wear upon the bearing-boxes, axle-sleeves, or rollers, thereby insuring a tight bearing.

If my improved running-gear is used in connection with a cart, it is not necessary, of course, to utilize a reach-pole, and in this event the three bearing-boxes mounted on the axle 9 are connected directly to the bed of the cart. Each of the upper sections of the bearing-boxes is preferably formed with an oil-hole 26, so that a lubricant can be readily admitted to the interior of each bearing.

What I claim is—

1. The combination with a vehicle-body having springs connected thereto; of a sectional bearing-box secured to each spring, an axle extending through the boxes, an intermediate section or box mounted on the axle, collars permanently connected to the axle and abutting against the boxes, rollers interposed between the axle and boxes, adjustable collars for retaining the rollers within the boxes and a reach-pole secured to the intermediate box.

2. The combination with a vehicle-body having springs secured thereto; of sectional boxes secured to the springs, removable spacing-strips interposed between the sections of each box, an axle rotatably mounted within the boxes, a centrally-disposed sectional box upon the axle, collars on the axle contacting with opposite faces of the boxes, antifriction devices within each bearing-box and retained by the collars, a reach-pole secured to the intermediate box and braces extending from said pole and secured to the boxes on the springs.

3. The combination with a vehicle-body having sectional bearing-boxes connected thereto; of a rotatable axle extending through the boxes, wheels mounted upon the ends of the axle, one of said wheels being rotatable independently thereof, a centrally-disposed sectional bearing-box upon the axle, rollers within the boxes and about the axle, means upon the axle for retaining the rollers within the boxes, a reach-pole secured to the centrally-disposed box and braces secured at their ends to the reach-pole and the boxes on the body.

4. The combination with a vehicle-body having springs connected thereto; of bearing-blocks each consisting of oppositely-disposed substantially similar sections having registering recesses, removable spacing-strips interposed between the sections, a base-plate upon one face of each bearing-block and extending therebeyond, means extending through the bearing-blocks for securing them and the springs and base-plates together, an axle rotatably mounted within the boxes, sleeves upon the axle and within the boxes and antifriction-rollers disposed within the boxes and upon the sleeves.

5. The combination with a vehicle-body having springs connected thereto; of bearing-blocks each consisting of oppositely-disposed substantially similar sections having registering recesses, removable spacing-strips interposed between the sections, a base-plate upon one face of each bearing-block and extending therebeyond, means extending through the bearing-blocks for securing them and the springs and base-plates together, an axle rotatably mounted within the boxes, sleeves upon the axle and within the boxes, antifriction-rollers disposed within the boxes and upon the sleeves and shafts connected to the base-plates.

In testimony whereof I have signed my name to this specification in the presence of two subscribing witnesses.

JAMES WILLIAM GARDNER.

Witnesses:
W. N. JARRATT,
O. E. PRINCE.